(12) United States Patent
Bailey et al.

(10) Patent No.: US 11,122,088 B2
(45) Date of Patent: *Sep. 14, 2021

(54) OPEN AUTHORIZATION CLAIM SCHEME TO SECURE RESOURCES

(71) Applicant: Itron, Inc., Liberty Lake, WA (US)

(72) Inventors: Jeffrey Scott Bailey, Coeur dAlene, ID (US); Elliott Edwards, Colbert, WA (US); John Andrew Laughlin, Spokane, WA (US); Rylan Herdt, Spokane Valley, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,487

(22) Filed: Feb. 28, 2020

(65) Prior Publication Data

US 2020/0204593 A1 Jun. 25, 2020

Related U.S. Application Data

(63) Continuation of application No. 15/656,940, filed on Jul. 21, 2017, now Pat. No. 10,581,918.

(51) Int. Cl.
*H04L 29/06* (2006.01)
*H04L 29/08* (2006.01)

(52) U.S. Cl.
CPC .......... *H04L 63/20* (2013.01); *H04L 63/0807* (2013.01); *H04L 63/10* (2013.01); *H04L 67/02* (2013.01); *H04L 67/125* (2013.01); *H04L 67/146* (2013.01)

(58) Field of Classification Search
None
See application file for complete search history.

(56) References Cited

U.S. PATENT DOCUMENTS

| | | | |
|---|---|---|---|
| 7,685,206 B1 * | 3/2010 | Mathew | H04L 63/105 |
| | | | 707/785 |
| 9,386,006 B1 * | 7/2016 | Maldaner | H04L 63/10 |
| 2012/0260194 A1 * | 10/2012 | Kennedy | G07F 15/10 |
| | | | 715/752 |

(Continued)

OTHER PUBLICATIONS

Office action for U.S. Appl. No. 15/656,940, dated Jun. 27, 2019, Inventor #1, "Open Authorization Claim Scheme to Secure Resources", 15 pages.

*Primary Examiner* — Fatoumata Traore
(74) *Attorney, Agent, or Firm* — Lee & Hayes, P.C.

(57) ABSTRACT

A device secures open authorization (OAuth) resources according to systems described herein. In some instances, a resource server is configured for receiving a request for authorization from a client device. The request, for authorization to use a requested resource, may include a token having at least one claim. The resource server may interpret data of the token according to a domain specific language. The interpreting may obtain at least one rule associated with the at least one claim from among a range of resource access control rules. The rule may be compared against a resource request and operation. Based on the comparison, the request may be allowed or rejected. In one example, interpretation of the token may decode resources including quantities and combinations of uniform resource identifiers (URIs) claimed by the token using a domain specific language defined by a context-free grammar.

19 Claims, 12 Drawing Sheets

(56) References Cited

U.S. PATENT DOCUMENTS

2016/0028737 A1* 1/2016 Srinivasan .......... H04L 63/0807
　　　　　　　　　　　　　　　　　　　　　726/1
2016/0164722 A1* 6/2016 Zhu ........................ H04L 67/02
　　　　　　　　　　　　　　　　　　　　　709/221
2019/0028512 A1　 1/2019 Bailey et al.

* cited by examiner

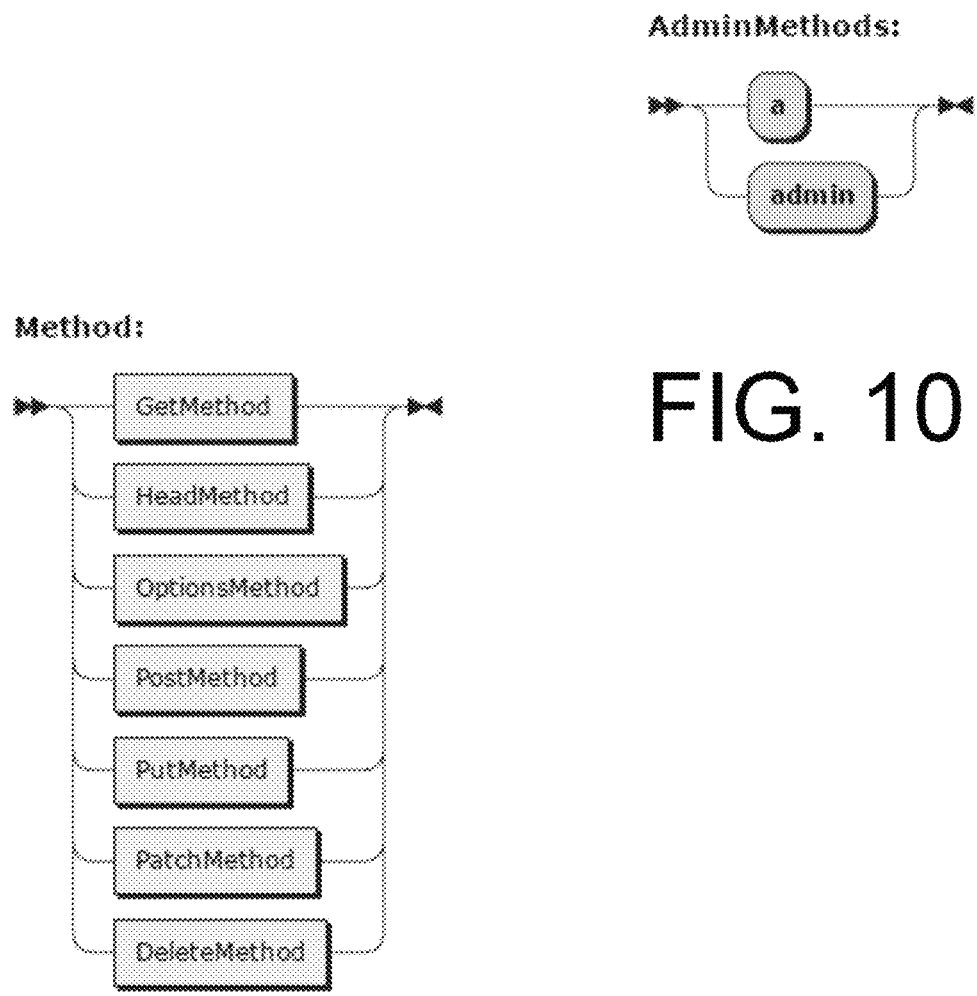
FIG. 10
FIG. 11
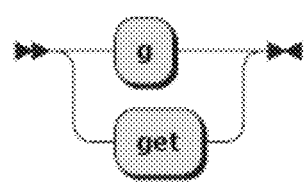
FIG. 12

OPEN AUTHORIZATION CLAIM SCHEME TO SECURE RESOURCES

RELATED APPLICATIONS

This application is a continuation of and claims priority to U.S. patent application Ser. No. 15/656,940, filed on Jul. 21, 2017, titled "Open Authorization Claim Scheme to Secure Resources," the entirety of which is incorporated herein by reference.

BACKGROUND

Open Authorization (OAuth) is an open standard, providing token-based authentication and authorization on the internet. A problem exists with current resource servers utilizing OAuth and providing application programming interfaces (APIs) configured according to representational state transfer (REST) web services. Such servers may require a database to authorize a particular client to use a particular API. The database provides substantial overhead for the system/server providing the APIs. Large scale applications (e.g., APIs serving social media applications used by millions of people such as Facebook and Twitter), require huge expenditures in servers, electricity, cooling, and maintenance. Under known technology, servers must process involved authentication procedures, resulting in excessive processor activity, response latency, network activity and excessive short- and long-term memory usage, and consumption of other computing resources.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIGS. 5-19 are diagrams showing example detail of a language and syntax, which support the configuration of a parser to interpret a range of access control rules, and to thereby obviate need to consult extended databases.

DETAILED DESCRIPTION

Overview

Figure 1:
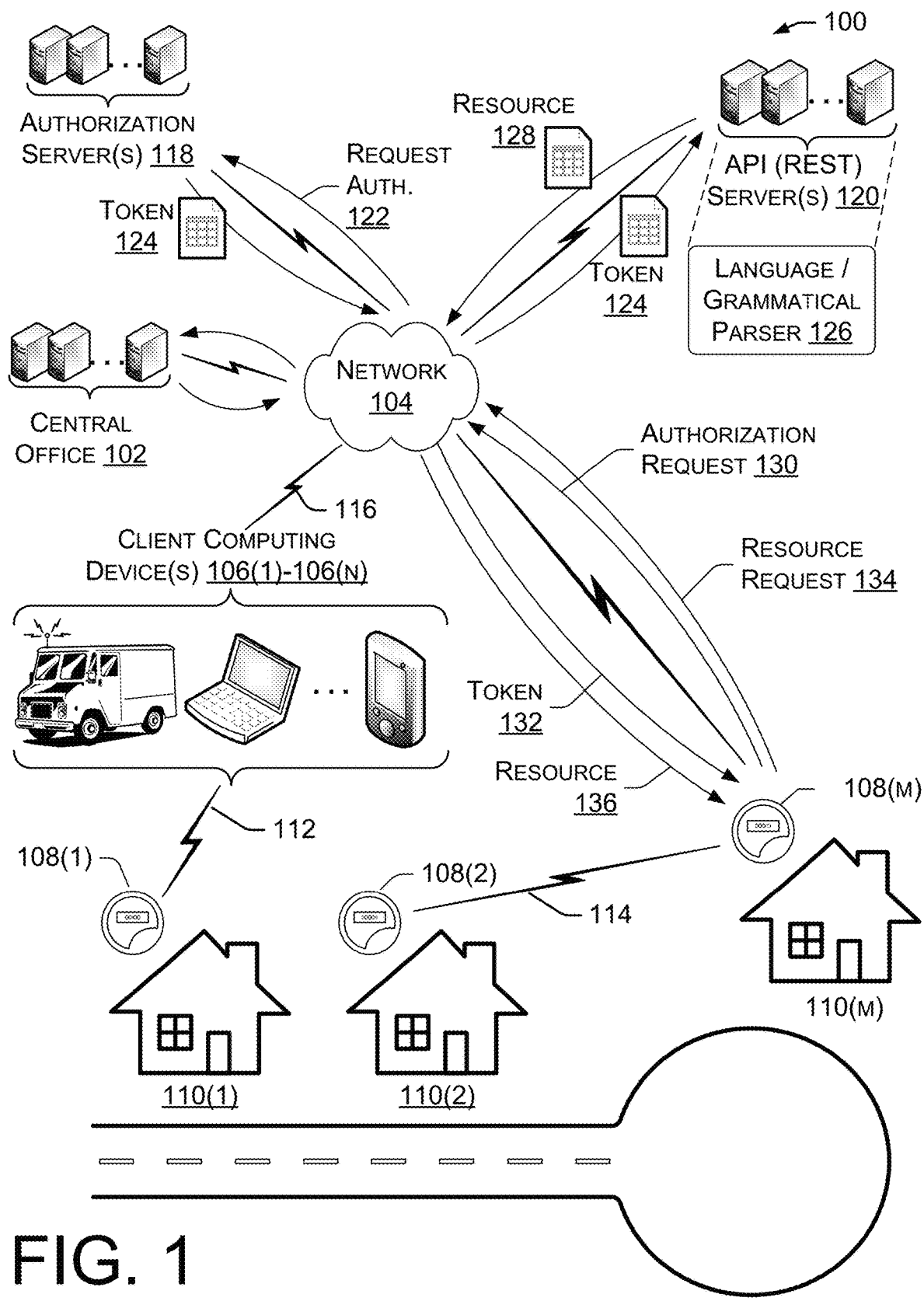
FIG. 1 is a diagram showing an example system configured for use as an open authorization claim scheme that secures representational state transfer (REST) resources.

Techniques for providing open authorization (OAuth) resources are described. In several examples, a resource may be representational of either a real-world concept (like "a tenant"), a physical thing (like "a device"), and may be something invented to aid conceptually in a problem domain (like a "flight" in a champagne app, or a "widget" in a user interface). In other examples, informational representation may be made up of particulate attributes. In a particular example, a "car" resource could be made up of a "VIN", a "Make", and a "Model." Accordingly, the "resource" may include the attribute names and values that represent the concept's state. In some instances, these attributes may change over time. Moreover, Web resources may include documents or files identified by URLs, and also encompass everything or every entity that can be identified, named, addressed or utilized.

In examples of the techniques for providing open authorization (OAuth) resources, a client device obtains a token from an authorization server, and uses the token to operate an application programming interface (API) at a resource-providing server. In some examples, this allows the resource-providing server to interpret a language and syntax used by the token to locally derive information that previously required access to a database. Accordingly, the resource-providing server operates much more quickly, with less electrical consumption, and with less network communications and/or internal bus bandwidth requirements.

Example System and Techniques

In example techniques, tokens containing authorization claims may be issued to a user, providing the user with permissions and/or privileges that associate the user with resources. The authorization claims may be issued via an OAuth service and/or in an OAuth protocol, and may be defined as a key:value pair. In an example, "Role":"Admin" indicates that the user has an admin role in a system. The techniques may be used with representational state transfer (REST) web services, which provide interoperability between computer systems by providing application programming interfaces (APIs) accessible to third parties over hypertext transfer protocol (HTTP). In REST web services, resources may be identified using uniform resource identifiers (URIs), in contrast to the uniform resource locators (URLs) used by internet browsers to locate resources, such as web pages. Such APIs may provide subroutine definitions, tools and/or protocols. The APIs may become tools for building and/or assisting application software, where the application software may execute on servers or systems remote from a system making calls to particular API(s).

In a further example, a protocol for a web authentication and authorization scheme may make use of one or more claims (e.g., access or use privileges) issued in an access token that is digitally signed by an authority. These claims may be free-form key value pairs, and a relying party may interpret their contents to decide whether or not a given web request should be allowed or not. The relying party may be a service that represents or provides resources (e.g., products and/or services) as one or more uniform resource identifiers (URIs) (e.g. http://host/classes/cs401) and may use standard HTTP methods (GET, PUT, POST, DELETE, etc.) for each resource. As used herein, resources may be use of a computer program and/or associated API, use of a network or database, access to content or information, etc. In some environments, a resource could include one or more of pre-paid electricity, water and/or gas, etc. Such a party may be configured as a system, server or network, and may pre-arrange, package and/or group claims that provide access to resources at an appropriate granularity. Such groupings may allow allocation of resources according to commonly associated, synergistic and/or complementary functions. In a naïve implementation, a distinct claim could be associated with every possible resource, combination of resources, and all allowed option(s). In alternative implementations, patterns of use may emerge that allow for a minimal set of claims to give access to a wider range of synergistically interacting resources. For example, standard HTTP methods GET, PUT, POST and DELETE may be so commonly used as to form an example of such a minimal set. Other sets of claims may be more specialized, but may also benefit from grouping together.

In an example protocol for web authentication and authorization, a domain specific language may be configured to represent resource access control rules as claim values, such as for use in a RESTful API. An example of the domain specific language (e.g., in the example seen below and labeled AuthorizationClaimType), may be defined in a context-free grammar, such as extended Backus-Naur form (EBNF). A domain specific language (DSL) may define not only HTTP methods, but also higher-level "rollups" of methods (such as read/write/readwrite and hex versions). The grammar of the domain specific language may precisely define a structure of a domain specific language. The language may express one or more sets, each set comprising of one or more HTTP methods and/or one or more patterns of uniform resource identifiers (URIs). An example of the language and associated syntax is also described visually by the attached drawing figures. By issuing claims with values represented in the formally-defined language, a flexible and extensible set of access control rules may be designed for, and to regulate use of, an API.

From this grammar, parsers can be designed and constructed that will allow for fast interpretation of a token, and statements and data within the token, to obtain a range of valid access control rules, as defined by the language. Once interpreted, the rule(s) can be compared against a given resource (e.g., in a format such as request+operation) and access can be granted or rejected as indicated. The parser, by extracting information from the token, obviates the need to access any database(s) to obtain the same and/or similar information. Accordingly, there is a savings of memory device use, network and/or data bus use, computer processor power, electricity, cost, etc.

Example Environment

FIG. 1 is a diagram showing an example system 100 configured for use in conjunction with an open authorization claim scheme to secure and protect representational state transfer (REST) resources. The example system 100 is shown in the context of the utility industry; however, the devices, techniques and systems described herein are broadly applicable to other industries, cloud computing, social media, and other areas. In the utility industry example, utility metering data is uploaded to a central office 102. The central office 102 may be connected to a network 104, such as the internet, via a connection provided by an internet service provider. In the example system 100, several representative client devices 106, are shown. In the example, a mobile truck-based radio-equipped data-gathering computing device 106(1) is configured for a "mobile mode," wherein data is gathered from metering devices 108 servicing customers 110 by exchange of RF signals 112. In a second example of a client device, a computing device 106(2) is configured with file, network and internet browsing and processing abilities, and may be used within the central office 102 or in remote locations. In a third example, a hand-held computing device 106(N) is configured for use by workers that may be in locations remote from the central office 102. The hand-held computing device 106(N) may communicate with metering devices 108, such as to collect data, download upgraded software and/or to perform meter diagnostics, analytics, or tests.

In the utility or smart grid environment, the metering devices 108 may be configured to measure utility consumption (e.g., electrical power use by a customer), as well as data concerning peak usage, particular appliance usage, conservation incentives, customer user interfaces, etc. The metering devices 108 may be configured according to star, mesh or mobile data communication modes. In an example of a mobile mode configuration, metering device 108(1) communicates over RF signals 112 with a mobile device (e.g. a truck-mounted radio computing device 106(1)), which relays data to a central office 102. In an example of a mesh mode, metering device 108(2) sends data upstream, such as over an RF connection 114, to metering device 108(M), which relays the data to network 104 and the central office 102. In an example of a star network, a metering device 108(M) communicates directly with network 104, and central office 102, such as by use of a cellular connection and/or the internet.

The client devices 106 may utilize RF or wired links 116 to connect to a network 104, such as the internet or a private intranet. In the example system 100 shown, the client devices 106 may communicate over the network 104 with the central office 102, authorization server(s) 118, and resource server(s) 120, such as API (REST) server(s).

The client devices 106 may request and receive authorization from the authorization servers 118 to use a resource provided by a resource server 120. In an example, an authorization request 122 may be sent by a client device 106 to the authorization server 118. The authorization server 118 may examine the credentials of the client device 106, and determine if authorization is indicated. In an example, if the client device 106 makes a valid payment, the request 122 may be approved, to thereby authorize the client device 106 to utilize a resource. In a further example, the client device may prove association with the central office 102, to become authorized for a resource use. If authorized, the authorization server 118 may issue a token 124 to the client device 106. The token may be configured according to a domain specific language representing claim values as resource access control rules defined according to the syntax of the language. Accordingly, decoding of the token (e.g., by interpretation of statements within the token) results in a definition of the "claims" or resource-use permissions associated with the token.

The client device 106 may utilize the token 124 to obtain resource(s) from the resource server 120. In the example system 100, the resource server 120 is configured to provide one or more application programming interfaces (APIs) associated with representational state transfer (REST) web services. The resources or services may include almost any desired service, such as access to a database, use of software, access to a network, access to content, etc. In the example system 100, the client device 106 passes the token 124 to the resource server 120.

The resource server 120 may utilize a language and/or grammatical parser 126 to parse or decode the token 124 to confirm that a valid authorization is present and/or to determine what resources are indicated by the authorization. The token 124 may be configured in a domain specific language for representing resource access control rules as claim values. The language may have a grammar and/or syntax (e.g., defined in EBNF) that precisely defines the resources to which the client device 106 is authorized. Having parsed the token 124 and determined the valid claims of the client, the resource server 120 may provide the resource(s) 128 to the client device 106.

In a further example, the smart metering device 108(M) may act as a client device and send an authorization request 130 to the authorization server 118, requesting authorization for a resource. If approved, the authorization server 118 will send a token at 132. Using the token, a resource request 134 may be sent to the resource server 120, requesting a resource. The parser 126 of the resource server 120 will decode the token, and determine the resources to which the smart metering device 108(M) is entitled. If indicated, the resource server(s) 120 will then provide the resources 136.

The resource server 120, or alternatively computer of the central office 102, may be configured to turn off the electrical power, gas or other utility to a customer, such as those associated with metering devices 108(1) through 108(m). In an example, a client device 106 or the central office computer(s) 102 request that electrical power service associated with a particular meter (e.g., meter 108(1) be turned off (or on), or other control over smart grid functions. The client device 106 may send a request for authorization 122 to the authorization server 118. The authorization server 118 may respond with a token 124. The token 124 may be sent to the resource server 120 or central office 102. Upon interpretation of content within the token 124, such as by the language and/or grammatical parser 126, the resource server 120 (or in some instances, the central office 102) will turn off (or on) service to the customer 108(1).

Example Client Device

Figure 2:
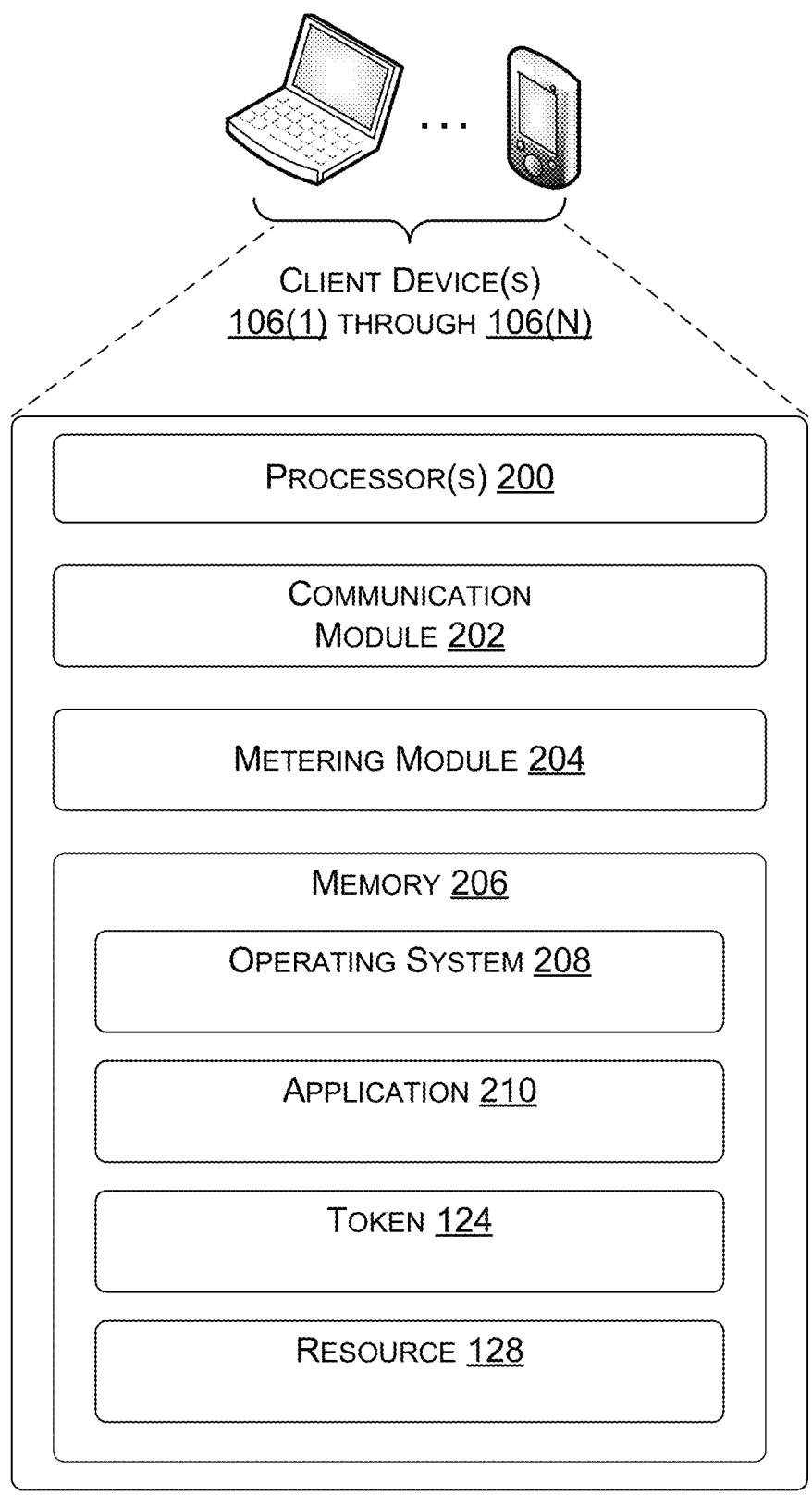
FIG. 2 is a diagram showing example detail of a client device.

FIG. 2 is a diagram showing example detail of a client device 106. The client device 106 is representative of computing devices 106(1) through 106(n) discussed with respect to FIG. 1. Also as shown, a smart meter device (e.g., metering device 108(m)) may act as a client device. The client device 106 may include a processor 200, which may communicate with a communications module 202, a metering module 204 and one or more memory devices 206. The communications module 202 may include any wired and/or wireless communications device(s), such as near field radio, wi-fi, cellular radio, Ethernet, cable, etc. The metering module 204 may include sensors for measuring consumption of electricity, gas, water, etc. The memory device 206 may include an operating system 208 (e.g., based on UNIX, etc.) and one or more software applications 210. The application(s) may direct operations of the communication module 202 and the metering module 204. The application(s) may also request one or more tokens 124 from an authorization server. By sending the token 124 to a resource server, the client device 106 may obtain one or more resources 128, which may include data, software, network access, content or other resource. In particular, the resource may be obtained by access to an API of an application operable on the resource server, and the resource 128 may be data obtained from the API.

Example Authorization Server

Figure 3:
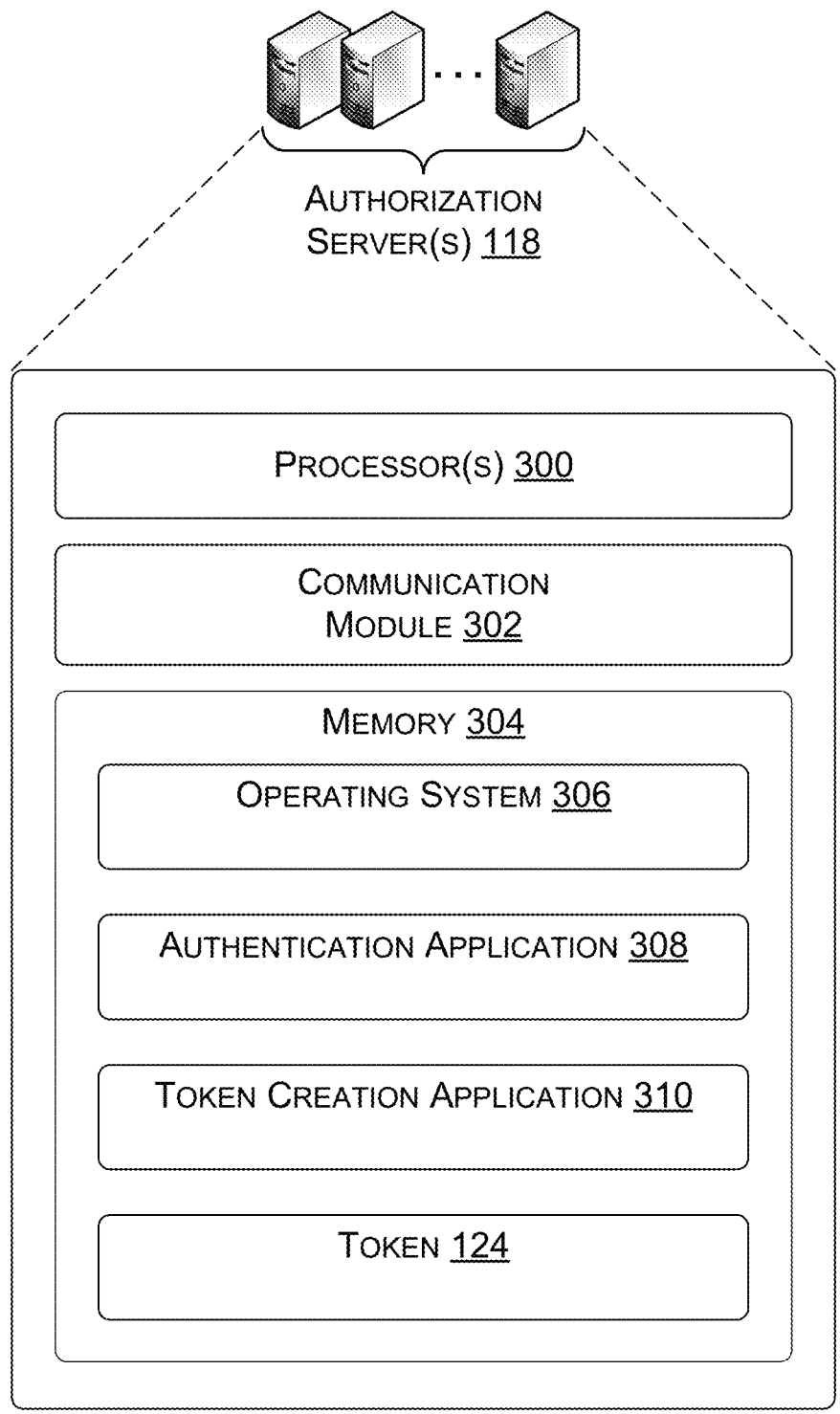
FIG. 3 is a diagram showing example detail of an authorization server.

FIG. 3 is a diagram showing example detail of an authorization server 118. In the example shown, a processor 300 may be configured to control a communications module 302 and to access a memory device 304. The memory device may have an operating system 306 and an authentication application 308. The authentication application 308 may be configured to review a request for authentication from a client and to approve or reject the request. The request may be based on verification of payment, verification of the identity of the requesting client device, etc. If the request is approved, a token creation application 310 is configured to create a token 124 that defines the resources to which the client device is entitled. The token 124 may be created in using a language or code that is expected by, and interpreted and/or decoded at, a resource server. Accordingly, the token 124 contains language and/or code that may be interpreted and/or decoded at a resource server or other content and/or service provider. Once interpreted, the token defines the "claims" or rights to services, content and/or resources of the token owner. The token may be cryptographically signed, to thereby guarantee the authenticity and prevent tampering of the token.

Example Resource Server

Figure 4:
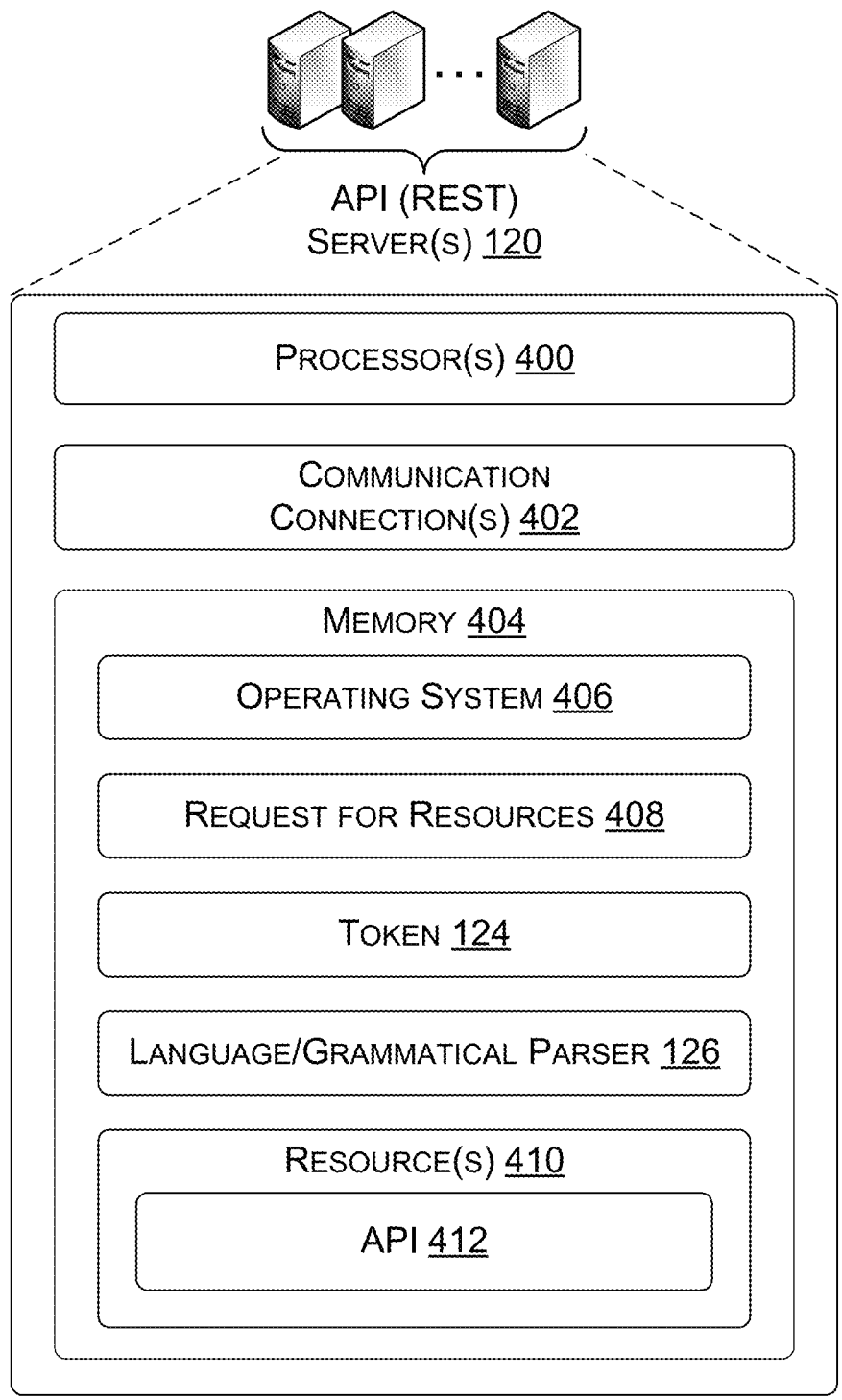
FIG. 4 is a diagram showing example detail of an API (REST) server.
Figure 5:
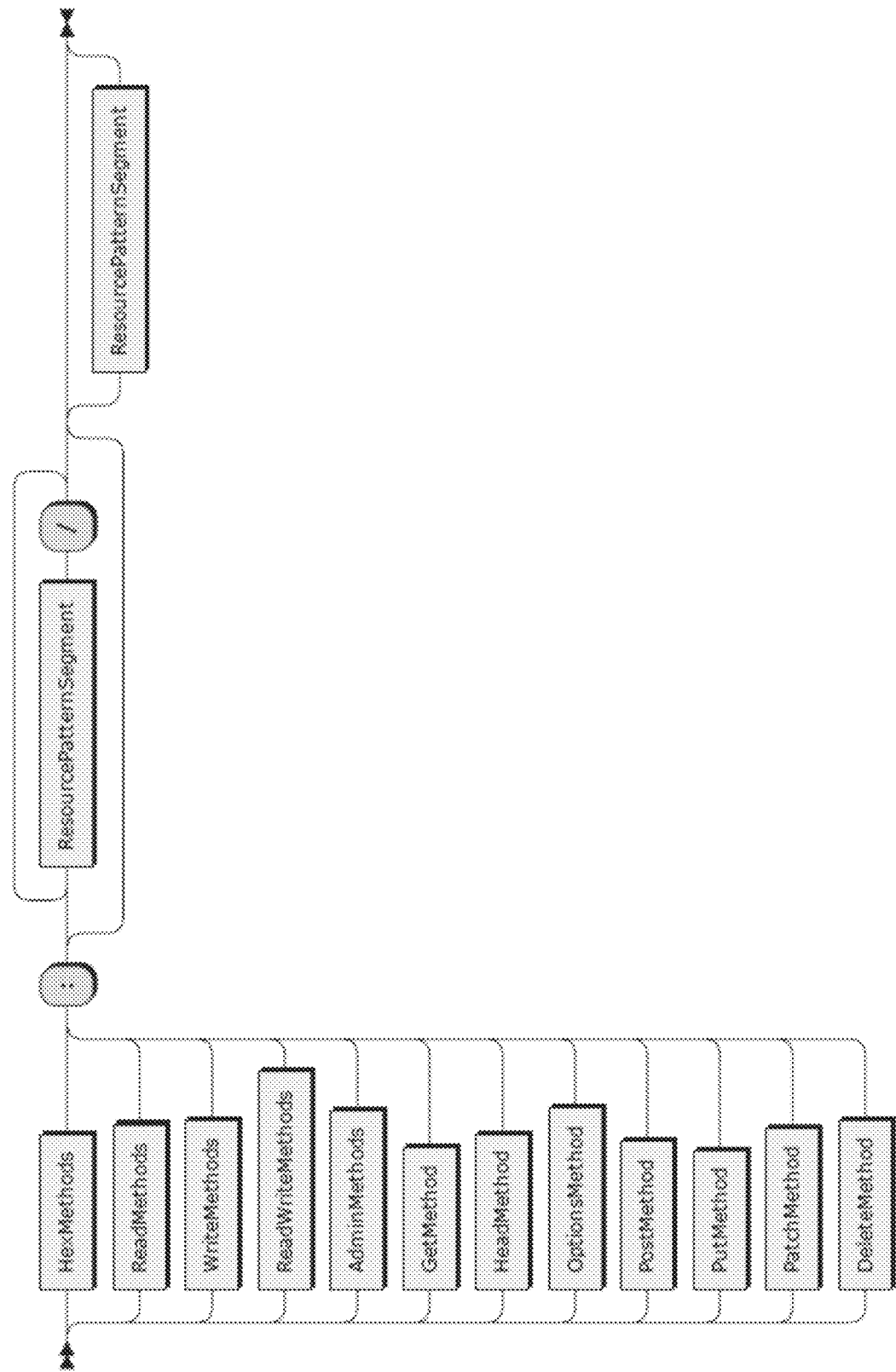

FIG. 4 is a diagram showing example detail of resource server 120, configured for purposes of example as an API (REST) server. In the example shown, a processor 400 may be configured to control a communications module 402 and to access a memory device 404. The memory device may have an operating system 406 and one or more applications. The resource server 120 may receive a request for resources 408, accompanied by a token 124, from a client. The request 408 may also include parameters and values for an API of the requested resource. The token 124 may be interpreted and/or decoded by a language and/or grammatical parser 126 or other tool, to determine the resources (content, services, network access, etc.) that are to be provided to the client. In an example, the resource server 120 may determine that the client is entitled to resources 410 having an API 412. Accordingly, parameters and values from the request for resources 408 may be applied to the API 412, allowing acquisition of the resources 410 for provision to the client.

Example Domain Specific Language and Grammar

FIGS. 5-19 are diagrams showing example detail of a domain specific language that expresses and/or represents resource access control rules, which define the rights of "claims" of a client device on a resource provider. Accordingly, a token, created and signed by an authentication server, may define the claims of a user device in the language and according to the grammar and syntax. A resource provider, configured to understand the language, may then verify the authenticity of the token, understand resources defined by the claims, and provide the resource. The resource provider may utilize a parser (e.g., language and/or grammatical parser 126 of FIGS. 1 and 4), configured to interpret the language and understand a range of indicated access control rules, and to thereby obviate need to consult extended databases.

Freedom from the need to consult databases saves the resource provider/server from significant processing and provides better response time (less command latency). Additionally, less bandwidth is required at the bus and network levels, and an overall savings of electricity and costs is realized.

Thus, a domain specific language, syntax and grammar for representing resource access control rules as claim values for use in a RESTful API is described herein. The example shows a language and context-free grammar (e.g., a language using a context-free grammar such as extended Backus-Naur form (EBNF)). The language precisely defines and/or expresses one or more of, first, a set of one or more HTTP methods, and second, a pattern or set of uniform resource identifiers (URIs). By issuing claims with values represented in this formal language, a flexible and extensible set of access control rules may be designed for an API. Moreover, conventional use of a database is overcome, resulting in significant processing advantages.

FIGS. 5-19 shows grammar indicating an example lexical structure of a language, and implies an example semantics of its interpretation. The grammar is consistent with rapid interpretation by a parser, and with a range of valid access control rules. Once interpreted, the rule(s) may be compared against a particular resource, e.g., in a format such as request+operation, and trivial calculation can result in allowance or rejection of access. The example lexical structure and grammar of FIG. 5 may be described as follows.

```
AuthorizationClaimType
::= ( HexMethods
 | ReadMethods
 | WriteMethods
 | ReadWriteMethods
 | AdminMethods
 | GetMethod
 | HeadMethod
 | OptionsMethod
 | PostMethod
 | PutMethod
 | PatchMethod
 | DeleteMethod)
 ':'
 (ResourcePatternSegment '/')* ResourcePatternSegment?
```

Figure 6:
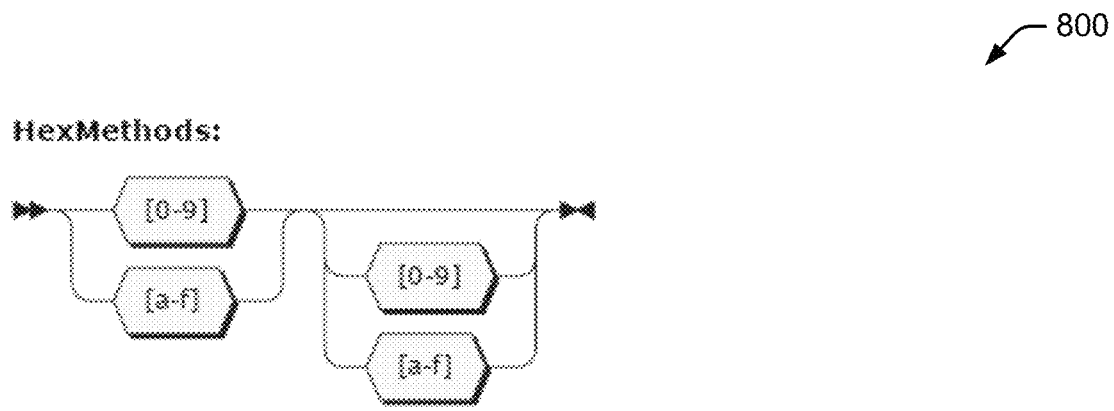
Figure 7:
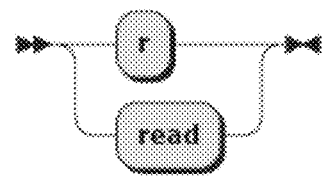
Figure 8:
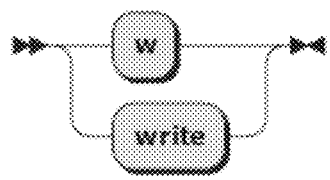
Figure 9:
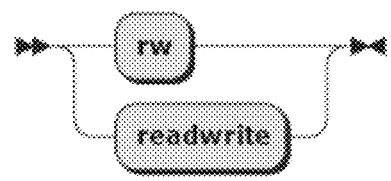
Figure 13:
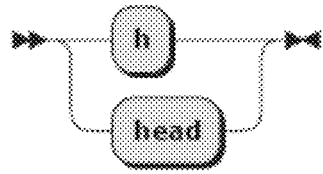
Figure 14:
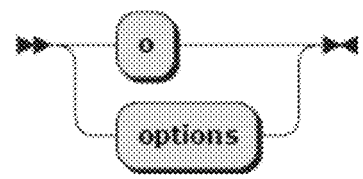
Figure 15:
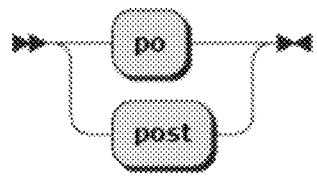
Figure 16:
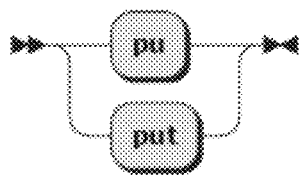
Figure 17:
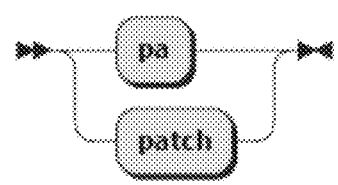
Figure 18:
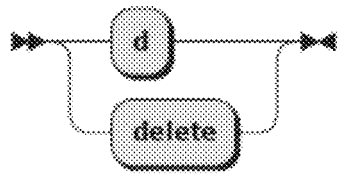
Figure 19:
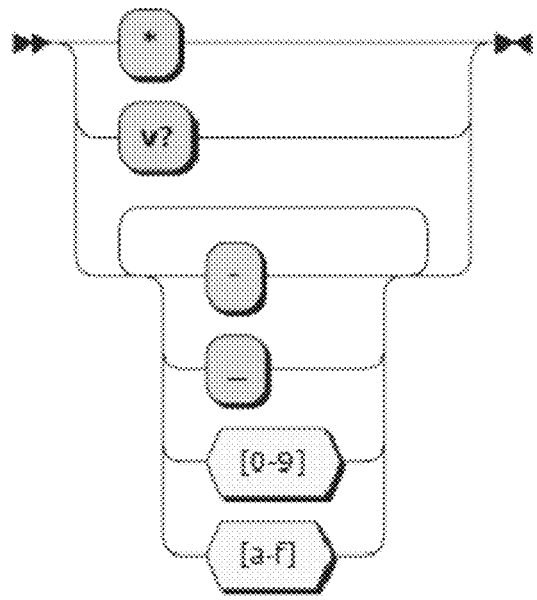

The example lexical structure and grammar of FIG. 6 may be described as follows.
HexMethods
::=[0-9a-f][0-9a-f]?
The example lexical structure and grammar of FIG. 7 may be described as follows.
ReadMethods
::='r'
|'read'
The example lexical structure and grammar of FIG. 8 may be described as follows.
WriteMethods
::='w'
|'write'
The example lexical structure and grammar of FIG. 9 may be described as follows.
ReadWriteMethods
::='rw'
|'readwrite'
The example lexical structure and grammar of FIG. 10 may be described as follows.
AdminMethods
::='a'
|'admin'
The example lexical structure and grammar of FIG. 11 may be described as follows.

Method
::=GetMethod
|HeadMethod
|OptionsMethod
|PostMethod
|PutMethod
|PatchMethod
|DeleteMethod
The example lexical structure and grammar of FIG. 12 may be described as follows.
GetMethod
::='g'
|'get'
The example lexical structure and grammar of FIG. 13 may be described as follows.
HeadMethod
::='h'
|'head'
The example lexical structure and grammar of FIG. 14 may be described as follows.
OptionsMethod
::='o'
|'options'
The example lexical structure and grammar of FIG. 15 may be described as follows.
PostMethod
::='po'
|'post'
The example lexical structure and grammar of FIG. 16 may be described as follows.
PutMethod
::='pu'
|'put'
The example lexical structure and grammar of FIG. 17 may be described as follows.
PatchMethod
::='pa'
|'patch'
The example lexical structure and grammar of FIG. 18 may be described as follows.
DeleteMethod
::='d'
|'delete'
The example lexical structure and grammar of FIG. 19 may be described as follows.
ResourcePatternSegment
::=('*'|'v?'|[-_0-9a-f]+)

Example Semantics and Associated Production Rules

An HttpAuthorizationExpression represents the valid range of claim values, and consists of
a. an "allowed method set"
b. followed by a ":"
c. and then a "resource pattern".
The "allowed method set" portion defines one or more HTTP methods that are allowed to the "bearer":
a. To keep the claim values short, certain presets may be defined. As an example:
 i. ReadMethods ("r" or "read") will allow all operations that do not mutate the state of the matching resource(s), such as:
  1. GET
  2. HEAD
  3. OPTIONS.

ii. WriteMethods ("w" or "write") will allow all operations that mutate (or create) the state of the matching resource(s), such as:
1. PUT
2. POST
3. PATCH
4. DELETE.
iii. ReadWriteMethods ("rw" or "readwrite") will allow all non-administrative methods (essentially the union of ReadMethods and WriteMethods).
iv. AdminMethods ("a" or "admin") will allow all methods (it is presumed that an "administrator" can do all possible operations on the specified resources).
b. For more fine-grained control, singular HTTP methods may be named. As an example:
i. GetMethod ("g" or "get") will allow the GET of the matching resource(s)
ii. HeadMethod("h" or "head") will allow the HEAD operation on the matching resource(s)
iii. OptionsMethod("o" or "options") will allow the retrieval of OPTIONS for the matching resource(s)
iv. PutMethod("pu" or "put") will allow the PUT of content to matching resource(s)
v. PostMethod("po" or "post") will allow the POST of content of the matching resource(s)
vi. PatchMethod("pa" or "patch") will allow the PATCH of content within the matching resource(s)
vii. DeleteMethod("d" or "delete") will allow the DELETE of matching resource(s).
c. For cases not yet utilized sufficiently to warrant a preset, a "hex mode" method set may be defined.
i. Every method has an associated numeric value laid out as a "bit set" (each operation gets a distinct bit in its binary representation).
1. GetMethod (0x01)
2. HeadMethod (0x02)
3. OptionsMethod(0x04)
4. PutMethod(0x08)
5. PostMethod(0x10)
6. PatchMethod(0x20)
7. DeleteMethod(0x40).
ii. Method sets may be configured by a bitwise ORing of their respective entailed methods.
1. ReadMethods (0x07,0b0111)=GetMethod (0x01, 0b0001)|HeadMethod (0x02,0b0010)|OptionsMethod (0x04,0b0100).
iii. Custom method sets can be allowed by using the hexadecimal digits of the bitwise ORed methods that are desired.
1. Which means you can use a method of "7" or "07" to get an equivalent to preset "r" or "read".
2. Which means you can mix or match any methods needed into a hexadecimal method set.

The "resource pattern" portion defines a "regular-expression-like" expression that indicates a range of possible resources.
a. A pattern has one or more "pattern operators".
i. One "global operator" is supported, and it may be the only content of the resource pattern.
1. A "resource pattern" of "*" means that all available resources would match. Thus a rule of "a:*" would mean "allow all methods on all resources."
ii. Two "segment pattern operators" may be supported, and may be the full content of a URI segment.
1. "*" will match all content within the segment.
a. E.g. "r:classes/*/students" would mean "allow read of all students of all classes"
b. "w:classes/*/assistants" would not match "classes/cs314/special/assistants" (because the segment wildcard does not span the "/").
2. "v?" will match a version segment starting with "v" and ending in a whole number.
a. E.g. "r:api/v?/teachers" would mean "allow read of teachers on all API versions"
b. "w:api/v?/coaches" would not match "api/vc/coaches".
iii. A "suffix pattern operator" is implied (unless explicitly canceled).
1. A pattern of "district/34/classes" will match "district/34/classes" AND "district/34/classes/cs566" but not "district/34/classessays".
a. This enables a simple "starts with" style check, and takes advantage of the "nesting" nature of resource APIs (If a user has global write access "w: districts", then they also are likely to have read access to "w:districts/81/calendar".
iv. One "suffix pattern operator" is supported and may come at the end of the pattern.
1. "$" will match the end of a URI, effectively disabling the implied suffix pattern operator.
2. E.g. a pattern of "post:district/34/survey$" would allow posting a survey with "district/34/survey" but not allow POSTing a question to "district/34/survey/questions".
b. Other than the pattern operators, a pattern may be a valid relative URI.
i. The pattern may be made absolute through the relying party API's absolute root URI (after verifying it is the "audience" of the access token).
c. ResourcePatternSegments
i. make up the portions of the pattern
ii. are separated by "/"
iii. optionally.
d. This pattern is "regular-expression-like" because
i. Analogous operators are more limited in this pattern as compared to regular expressions;
ii. It doesn't support the full range of options/features of regular expressions;
iii. Other than the pattern operators, a pattern may be a valid relative URI.
e. The Production rule for ResourcePatternSegment is for example only. An alternative implementation may require additional features, depending on the API/application.

Example Methods

In some examples of the techniques discusses herein, the methods of operation may be performed by one or more application specific integrated circuits (ASIC) or may be performed by a general-purpose processor utilizing software defined in computer readable media. In an ASIC or other hardware-based implementation, various devices may be configured as APIs, and can make use of hardware processing to efficiently authorize RESTful access. The need for explicit resource-based access is also useful in embedded hardware, such as in an example wherein a database lookup is not practical and/or feasible. However, an application specific device could be configured to implement a JSON web token (JWT) validation scheme using authorization schemes discussed herein. In the examples and techniques discussed herein, the memory devices 206, 304, 404 may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 20:
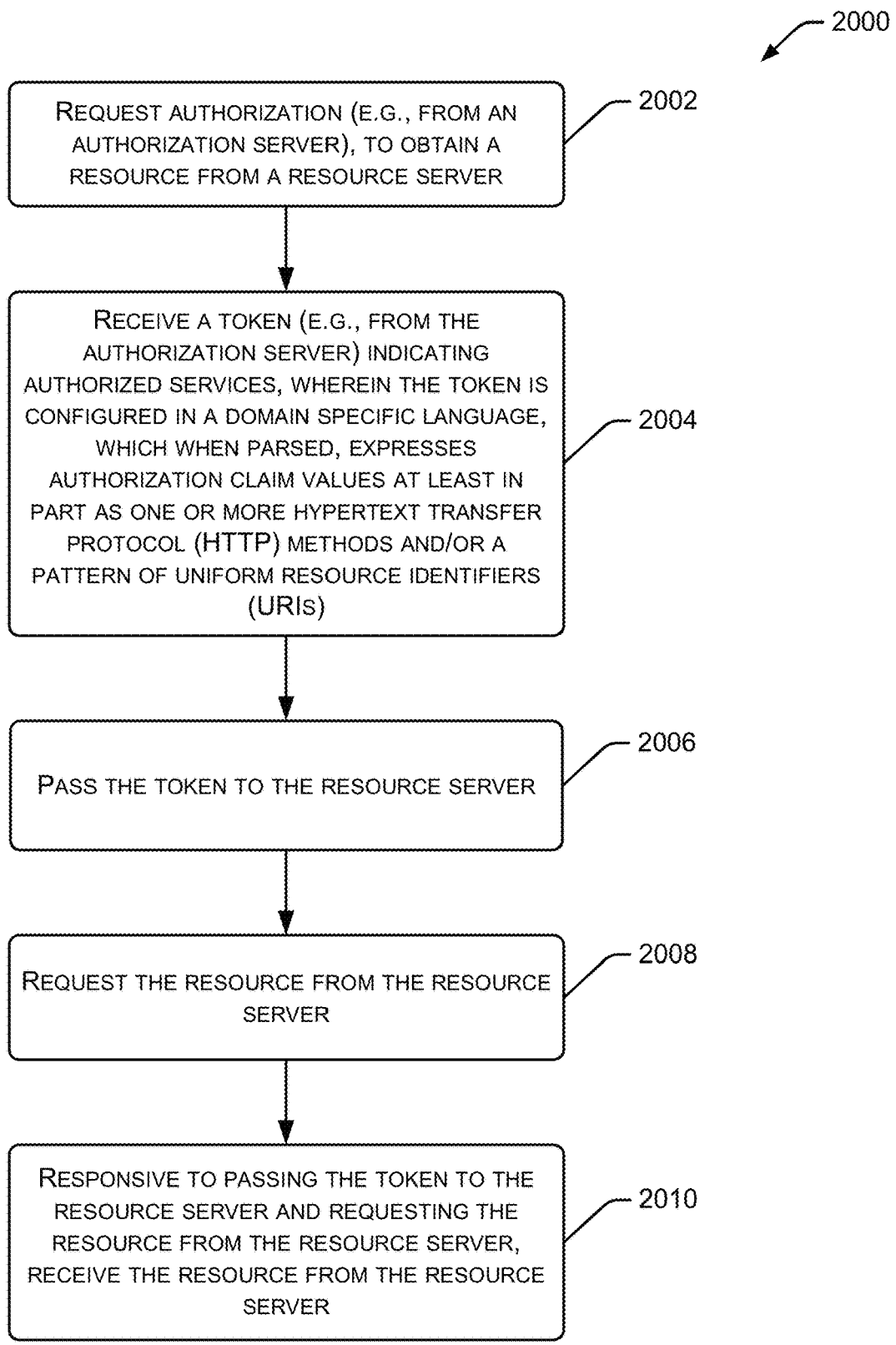
FIG. 20 shows an example method by which a client device requests a token from an authorization server, and then uses the token to access a resource from a third-party application and associated API (e.g., on a resource server).
Figure 21:
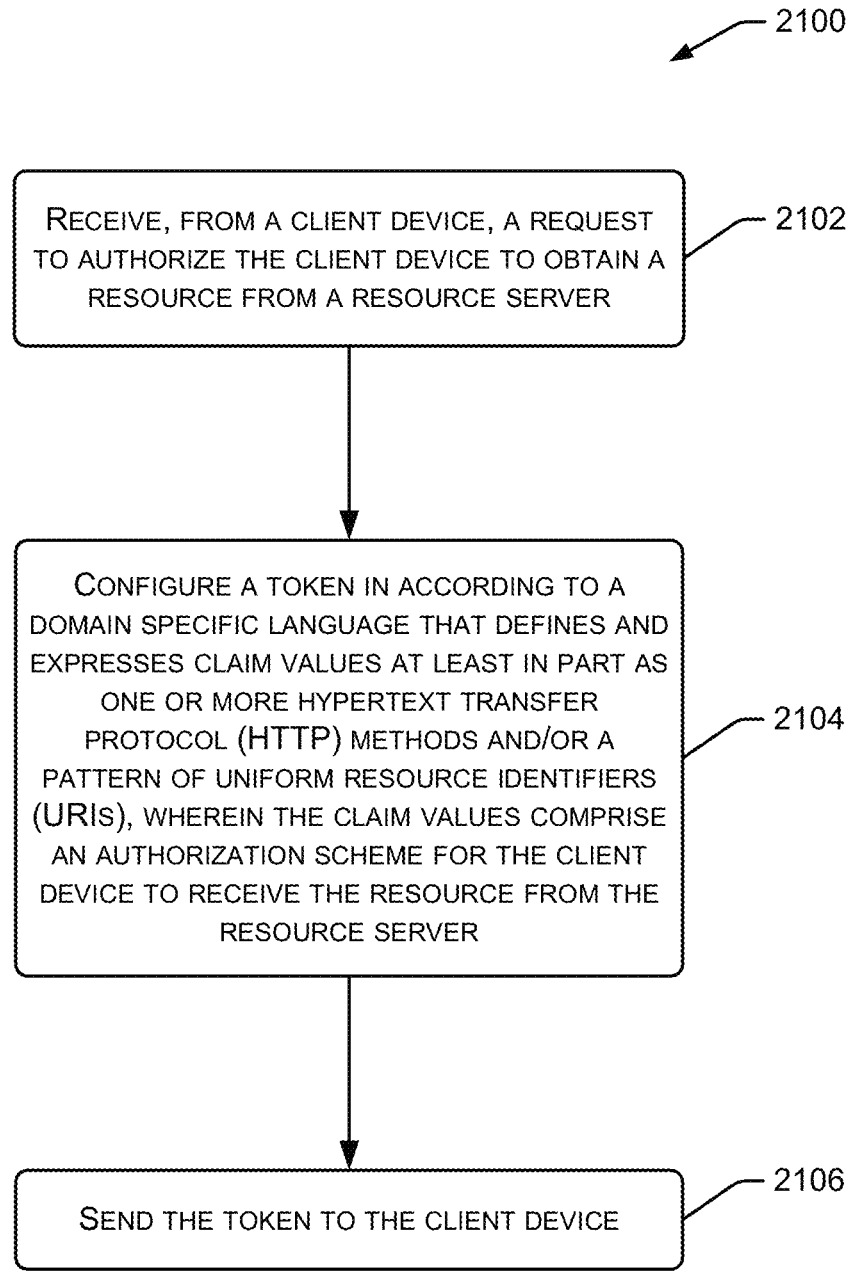
FIG. 21 shows an example method by which an authorization server receives a request from a client and creates a token indicating resources to which the client is entitled.
Figure 22:
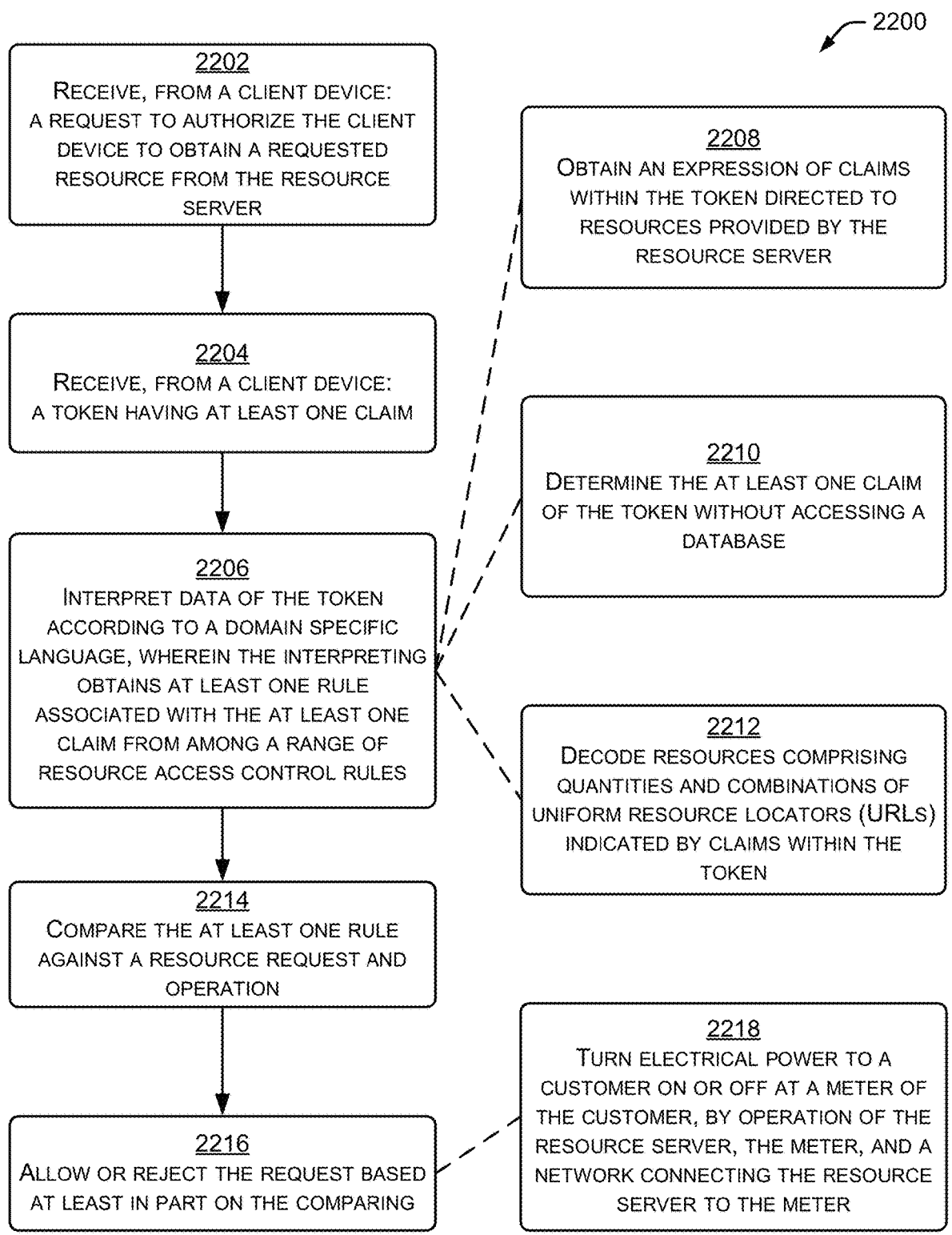
FIG. 22 shows an example method by which a resource provider receives a token from a client, interprets data from the token, and determines resources to which the client is entitled based on results of the interpretation.

FIGS. 20-22 are flow diagrams showing an example processes 2000-2200 that are representative of techniques for use by a device to secure open authorization resources and/or for an open authorization claim scheme to secure resources. The processes may, but need not necessarily, be implemented in whole or in part by the system or system 100. The processes are described with references to the system and system 100 for ease of understanding, but are not limited to those uses. Accordingly, the system 100 are capable of performing numerous other processes and the processes 2000-2200 may be implemented using numerous other systems.

FIG. 20 shows an example method 2000 by which a client device requests a token from an authorization server, and then uses the token to access a resource from a 3rd party application and associated API (e.g., on a resource server). At block 2002, a request for authorization to obtain a resource from a resource server is made, such as by a client device. In the example of FIG. 1, a client device 106 requests authorization from an authorization server 118.

At block 2004, a token is received at the client device. In the example of FIG. 1, the token 124 is sent by the resource authorization server 118. The token 124 may indicate authorized services, to which the client device 106 is entitled. The token may be configured in a domain specific language, which when parsed, expresses claim values at least in part as one or more hypertext transfer protocol (HTTP) methods and/or a pattern of uniform resource identifiers (URIs) that define a set of HTTP requests that a user is authorized to make. The token may be signed by the resource server, in response to verification of the identity of the user and/or user device, payment by the user, etc.

At block 2006, the token may be passed to the resource server. In the example of FIG. 1, the resource server 120 is configured as an API (REST) server(s), configured with one or more resources and associated APIs available to client devices having appropriate tokens.

At block 2008, the resource is requested by the client device from the resource server. In the example of FIG. 1, the client device sends a request and token 124 to the resource server (e.g., API (REST) resource server(s) 120).

At block 2010, the resource, sent by the resource server, is received at the client. In some examples, the resource benefits the client, but is not actually received by the client. As an example, the resource server may take an action (such as turning on or off power at one or more locations). Accordingly, the resource benefits the client, who may have requested the action, but does not receive the action. In some examples, the client may, additionally or alternatively to receipt of the resource, receive an acknowledgement and/or a receipt, which verifies or confirms performance and/or success of the performance or delivery of the resource. As an example, the client may receive the resource (e.g., data or access to software or other services) and a receipt. However, in some instances the resource may not be sent to the client. For example, if the resource is tuning on or off electrical service to a location remote from the client, the client may receive a receipt and/or acknowledgement that the action was performed, and that the client received the benefits to which it was entitled according to the token. The power may be turned on or off by the resource server or other network or smart grid device. In the example of FIG. 1, the resource 128 is sent by the resource server 120 to the client device 106. The resource may be sent by the resource server responsive to passing the token to the resource server and requesting the resource from the resource server. In example where the resource is sent to the client, the resource may be data, use of a computer application, etc.

An operation may interact with the resource indicated by the URI. However, depending on the HTTP method and/or implementation involved, returning the resource as response content is optional and/or may depend on the actions taken. In several examples: a GET will almost always return resource content; a PUT rarely will return resource content; a PATCH may return resource content; a DELETE may return resource content (e.g., the deleted resource is returned); and a POST will return resource content, if the resulting created resource has server-assigned values.

In a variation of the implementation, resource access control rules may be represented as claim values within the token. The token may define claims using a domain specific language, which may utilize a context-free grammar, such as extended Backus-Naur form (EBNF). Additionally, the domain specific language may express a pattern of uniform resource identifiers (URIs). In a second variation, resource access control rules may represent claim values using a domain specific language that regulates permissions required by a representational state transfer (RESTful) application programming interface (API) operable on the resource server. FIG. 1 shows an example RESTful resource server 120. In a third variation, resource access control rules are represented using the domain specific language having a context-free grammar that expresses the set of one or more hypertext transfer protocol (HTTP) methods. In a fourth variation, the token provided by the resource authorization server comprises at least one claim and the claim may be expressed using the set of one or more HTTP methods and the pattern of uniform resource identifiers (URIs).

FIG. 21 shows an example method 2100 by which an authorization server receives a request from a client and creates a token indicating resources to which the client is entitled. At block 2102, an authorization server receives a request, such as from a client device, to authorize the client device to obtain a resource from a resource server. At block 2104, a token is configured in according to a domain specific language, and may be signed by the authorization server. The language may define and express one or more claim values at least in part as one or more hypertext transfer protocol (HTTP) methods and/or a pattern of uniform resource identifiers (URIs), which may define a set of HTTP requests that a user is authorized to make. The claim values may include an authorization scheme for the client device to receive the resource from the resource server. Accordingly, the token defines the claims to resources using a language that may be interpreted by a resource server, to determine the claims defined by the language. At block 2106, the token is sent from the authorization server to the client device.

In a variation of the implementation, the claim values may be configured according to resource access control rules in the domain specific language. Additionally, the claim values may express key-value pairs which indicate the resource at the resource server. In a second variation, the claim values may be represented as resource access control rules using the domain specific language to provide permissions required by a representational state transfer (RESTful) application programming interface (API). In a third variation, the domain specific language may include a context-free grammar and may express one or more hypertext transfer protocol (HTTP) methods. In a fourth variation, the claim values may be expressed using both hypertext transfer protocol (HTTP) methods and patterns of uniform resource identifiers (URIs) and the one or more hypertext transfer protocol (HTTP) methods and a pattern of uniform resource identifiers (URIs) define the resource on the resource server.

FIG. 22 shows an example method 2200 by which a resource provider receives a token from a client, interprets data from the token, and determines resources to which the client is entitled from results of the interpretation. At block 2202, a request is received, at a resource server and from a client device. The request seeks permission to authorize the client device to obtain a requested resource from the resource server. At block 2204, the resource server receives, from a client device, a token having at least one claim to a resource provided by the resource server. At block 2206, data of the token is interpreted according to a domain specific language. The interpreting may obtain or identify at least one rule associated with the at least one claim from among a range of resource access control rules. The interpreting may also verify permissions by the client device to receive the resource. In the example of block 2208, an expression of claims may be obtained by interpreting code within the token that is directed to resources provided by the resource server. In a further example seen at block 2210, the at least one claim of the token may be determined by the interpretation of the token without a need or requirement of accessing a database or remote data structure. In a further example seen at block 2212, the decoding of resources may include decoding quantities and combinations of uniform resource identifiers (URIs) claimed by the token. At block 2214, one or more rules obtained by interpreting data within the token may be compared against a resource request and operation, which may be in the format request+operation. Using the rules, the resources and operations indicated as "claims" of the client device and permitted by the token, may be determined. At block 2216, the request may be allowed or rejected based at least in part on the comparing at block 2214. Thus, if the request by the client device for resources is verified by interpretation and/or decoding of the token, the request is allowed.

Block 2218 shows an example action of a resource server or resource provider, responsive to allowance of the request at block 2216. In the example, electrical power to a customer is turned on or off at a meter of a customer. The power may be turned on or off by remote activation of switch(es) in, or in communication with, a meter of the customer, such as meter 108 (shown in FIG. 1). Accordingly, the meter(s) of customer(s) can be used to remotely control power to respective customer(s). This action may be initiated by a client device and/or the central office device(s). The action(s) may be based at least in part on an authorization server and/or associated authorization request(s) and resultant token(s). The action(s) may be performed by resource server(s) and/or the central office server(s), and at the meter(s) of the customer(s).

In an example, authorization may be requested, such as from an authorization server, to obtain a resource from a resource server. A token may be received, such as from the authorization server. The token may indicate authorization to obtain the resource. The token may be configured in a domain specific language which, when parsed, expresses authorization claim values at least in part as one or more hypertext transfer protocol (HTTP) methods and a pattern of uniform resource identifiers (URIs). In the example, resource access control rules may be represented using the domain specific language defined by a context-free grammar that expresses the one or more hypertext transfer protocol (HTTP) methods. The token may be passed to the resource server. The resource may be requested from the resource server. In an example, the resource may include access to control of one or more smart grid functions. Responsive to passing the token to the resource server and requesting the resource from the resource server, the client may receive benefit of the one or more smart grid functions. The functions may include turning electrical power to a customer on or off at a meter of the customer. This may be achieved by operation of the resource server, the meter, and a network connecting the resource server to the meter, or by other actions, depending on the system and network.

In a first example implementation by which a meter may be turned on or off via an API, a PUT request is sent to a "/meter/1" URI with payload such as "{'name':'n', 'on': false}". This action effectively replaces the entire meter resource with the updated value. An indication of success/failure would be returned. In a second example, a PATCH request is sent to a "/meter/1" URI with payload that explicitly updates (PATCHes) the meter resource's "on" property to "false" (or the reverse). An indication of success/failure would be returned, possibly with the full content of the updated meter resource (now with "on" set to "false"). In a third example, a POST command is sent to a "/meter/1/commands" URI to create a new "meter command" resource that would then represent the "turn off" operation. Either the result of the disconnect operation is immediately returned, or a status that indicates it is "in progress" (subsequent polling may be needed to obtain the ultimate result if the notice of the result takes too long).

Example claims to do one of the previous examples may look like (in verbose form):
"PUT:meter/1" (only allow a full replace of meter 1)
"PATCH:meter/*" (patch any property on any meter)
"POST:meter/*/commands$" (post a new meter command on any meter, but avoid matching uris that are have that prefix, like "meter/1/commandset").

In a further variation, the domain specific language may utilize a context-free grammar (e.g., in extended Backus-Naur form (EBNF)) and expresses a set of one or more hypertext transfer protocol (HTTP) methods. In a second variation, the domain specific language may define a granularity of control over resources comprising quantities and combinations of uniform resource identifiers (URIs). In a third variation, the domain specific language comprises a valid range of claim values expressed as a method set, followed by a delimiter, and then a resource pattern. In a fourth variation, the claims of the token are defined according to resource access control rules in the domain specific language; the domain specific language expresses at least one hypertext transfer protocol (HTTP) method; and the domain specific language expresses a pattern of uniform resource identifiers (URIs). In a fifth variation, claim values of the token are represented as resource access control rules using the domain specific language to regulate permissions required by a representational state transfer (RESTful) application programming interface (API). In a sixth variation, the at least one claim comprises read, write, get and put methods.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
under control of one or more processors configured with executable instructions:
receiving, from a client device, a request to authorize the client device to obtain a resource from a resource server;
configuring a token in according to a domain specific language that defines and expresses authorization claim values at least in part as one or more of hypertext transfer protocol (HTTP) methods and a pattern of uniform resource identifiers (URIs), wherein the claim values comprise an authorization scheme for the client device to receive and/or benefit from the resource from the resource server, wherein the token comprises at least one of:
a first preset claim value granting use by the client device of two or more read operations; or
a second preset claim value granting use by the client device of two or more write operations; and
sending the token to the client device.

2. The method of claim 1, wherein:
the claim values are configured according to resource access control rules in the domain specific language; and
the claim values express key-value pairs which indicate the resource at the resource server.

3. The method of claim 1, wherein the claim values are represented as resource access control rules using the domain specific language to provide permissions required by a representational state transfer (RESTful) application programming interface (API).

4. The method of claim 1, wherein the domain specific language is defined by a context-free grammar and expresses one or more hypertext transfer protocol (HTTP) methods that define a set of HTTP requests that a user is authorized to make.

5. The method of claim 1, wherein:
the claim values are expressed using both hypertext transfer protocol (HTTP) methods and patterns of URIs; and
the one or more HTTP methods and the pattern of URIs define the resource on the resource server that define a set of HTTP requests that a user is authorized to make.

6. A method, comprising:
under control of one or more processors of a resource server configured with executable instructions:
receiving, from a client device:
a request to authorize the client device to obtain a requested resource from the resource server; and
a token comprising a hypertext transfer protocol (HTTP) method set represented by bitwise ORing of a respective bit of each HTTP method to which the client device is allowed access;
interpreting data of the token according to a domain specific language, wherein the interpreting derives at least one rule associated with the HTTP method set from among a range of resource access control rules;
comparing the at least one rule against the request; and
allowing or rejecting the request based at least in part on the comparing.

7. The method of claim 6, wherein interpreting the data of the token according to the domain specific language comprises:
obtaining an expression of claims within the token directed to resources provided by the resource server.

8. The method of claim 6, wherein interpreting the data of the token according to the domain specific language comprises:
determining the at least one claim, directly from examination of the token, without accessing a database.

9. The method of claim 6, wherein interpreting the data of the token according to the domain specific language comprises:
decoding resources comprising quantities and combinations of uniform resource identifiers (URIs) indicated by claims within the token.

10. The method of claim 6, wherein the domain specific language is defined by a context-free grammar and expresses one or more HTTP methods.

11. The method of claim 6, wherein the domain specific language defines a granularity of control over resources comprising quantities and combinations of uniform resource identifiers (URIs).

12. The method of claim 6, wherein the domain specific language comprises a range of claim values expressed by the method set, followed by a delimiter, and then a resource pattern.

13. The method of claim 6, wherein:
the claims are defined according to resource access control rules in the domain specific language;
the domain specific language expresses at least one hypertext transfer protocol (HTTP) method; and
the domain specific language expresses a pattern of uniform resource identifier (URIs).

14. The method of claim 6, wherein claim values are represented as resource access control rules using the domain specific language to regulate permissions required by a representational state transfer (RESTful) application programming interface (API).

15. The method of claim 6, wherein the at least one claim comprises at least one of read, write, get, put and delete methods.

16. A method implemented at least in part by a meter, the method comprising:
receiving, at the meter and from a resource server, a command to perform an action, the command being received based at least in part on the resource server having received a token from an authorization server, wherein the token comprises:

resource access control rules that are represented using a domain specific language defined by a context-free grammar that expresses one or more hypertext transfer protocol (HTTP) methods that define a set of HTTP requests, wherein the domain specific language has syntax and grammar for representing the resource access control rules as claim values for use in a representational state transfer (RESTful) application programming interface (API) that shows a language and context-free grammar in extended Backus-Naur form (EBNF), wherein the domain specific language defines a flexible and extensible set of access control rules for the API; and a claim that is expressed using the one or more HTTP methods and a pattern of URIs that define the set of HTTP requests; and based at least in part on receipt of the command at the meter, performing the action.

17. The method of claim 16, wherein the action comprises turning on or off a service to a customer site.

18. The method of claim 17, wherein the service comprises one of electricity, water, or gas service to the customer site.

19. The method of claim 16, wherein the command is received based further on:

a client device having sent a request to the authorization server for the token, the token indicating resources to which the client device is entitled;

the client device having received the token from the authorization server; and the client device having sent the token to the resource server.

* * * * *